(12) United States Patent
Adams

(10) Patent No.: US 7,226,536 B2
(45) Date of Patent: Jun. 5, 2007

(54) PORTABLE WATER FILTRATION DEVICE

(76) Inventor: Tyran Adams, 5445 S. 22nd St., Omaha, NE (US) 68107

( * ) Notice: Subject to any disclaimer, the term of this patent is extended or adjusted under 35 U.S.C. 154(b) by 0 days.

(21) Appl. No.: 11/496,345

(22) Filed: Jul. 31, 2006

(65) Prior Publication Data
US 2006/0266690 A1 Nov. 30, 2006

Related U.S. Application Data

(63) Continuation-in-part of application No. 11/111,426, filed on Apr. 21, 2005, now abandoned.

(51) Int. Cl.
*C02F 9/02* (2006.01)
(52) U.S. Cl. ............... 210/202; 210/259; 210/266
(58) Field of Classification Search ........... 210/202, 210/266, 259
See application file for complete search history.

(56) References Cited

U.S. PATENT DOCUMENTS

| | | | | |
|---|---|---|---|---|
| 4,196,081 A | * | 4/1980 | Pavia | 210/94 |
| 4,670,144 A | * | 6/1987 | McCausland et al. | 210/244 |
| 5,004,535 A | * | 4/1991 | Bosko et al. | 210/90 |
| 6,080,313 A | * | 6/2000 | Kelada | 210/631 |

* cited by examiner

*Primary Examiner*—Ivars C. Cintins
(74) *Attorney, Agent, or Firm*—Adam H. Jacobs

(57) ABSTRACT

A portable water filtration device includes a liquid-tight filter container and a filtration device mounted in the liquid-tight container. The filtration device includes an inlet opening extending through one of the walls and a first filtration device in liquid transfer connection with the inlet opening operative to receive and filter liquid flowing therethrough. A second filtration device is operative to receive liquid from the first filtration device and further filter the liquid flowing therethrough. The first and second filtration devices are selected from the group including ultraviolet, activated carbon and reverse osmosis filters, and an outlet opening extending through one of the walls then receives the treated water and releases the water from the filtration device. Finally, the liquid-tight filter container is operative to prevent liquid from entering the interior volume thereof thereby preventing contamination of the filtration device from accidental incursion of contaminants.

14 Claims, 4 Drawing Sheets

PORTABLE WATER FILTRATION DEVICE

CROSS-REFERENCE TO RELATED APPLICATION

This continuation-in-part application claims priority to the filing date of related patent application Ser. No. 11/111,426 filed on Apr. 21, 2005 now abandoned.

BACKGROUND OF THE INVENTION

1. Technical Field

The present invention is directed to filtration devices for water and, more particularly, to a portable water filtration device which includes a liquid-tight filter container having side walls, a base wall, a top opening and a lid for covering and sealing the top opening and a filtration device mounted within the liquid-tight container, the filtration device including an inlet opening which is connectable to a water source to be filtered, a first filtration device in liquid transfer connection with the inlet opening, a second filtration device in liquid transfer connection with the outlet of the first filtration device, the first and second filtration devices being selected from a group including ultraviolet, activated carbon and reverse osmosis water filters, an outlet opening in liquid transfer connection with the outlet of the second filtration device, the inlet and outlet openings being interchangeable such that water to be filtered may enter through either the inlet or outlet opening with water flow through the device proceeding in either direction, a battery device operative to supply power to one of the first and second filtration devices and a solar panel connectable to the battery device for recharging the battery device for use thereof.

2. Description of the Prior Art

Obtaining potable water is generally not a pressing concern for those of us fortunate enough to have been born in or raised in industrialized nations such as the United States, the nations of Europe and other such well-to-do nations. We generally take for granted the ability to turn the faucet on and drink water directly from the tap no matter where we are in those countries and thus do not concern ourselves with the fact that much of the fresh water available on the earth's surface is not acceptable for drinking without applying some kind of treatment or filtration process. However, in many developing third-world countries, it is not always so easy to obtain water for drinking. In general, water in these countries must be treated and/or purified by the drinker of the water prior to its becoming potable. Various chemical and mechanical contrivances has been designed to prepare and/or filter the water, but each of these devices have inherent disadvantages, usually relating to the volume of water which can be prepared and the ease by which the filtration or water preparation unit can be transferred to the location where it is needed.

These problems become even greater in magnitude during natural disasters and in the immediate aftermath thereof. For example, in the December 2004 tsunamis which traveled throughout the Indian Ocean basin, many of the developing and/or third-world countries in the area were severely impacted by the enormous waves. One of the major difficulties encountered after the tsunamis occurred was obtaining potable water for the millions of survivors, as the vast majority of available water sources had been contaminated by bacteria, minerals or other such contaminants. The individuals hardest hit in the tsunami disaster were unable to obtain potable water, which led to the deaths of countless other persons who could have been saved had access to potable water been provided. There is therefore a need for a portable water filtration device which may be quickly and easily transported to a location where it is needed and also which is capable of providing a substantial amount of potable water to enable a large number of persons to obtain potable water from the filtration device.

Several examples are found in the prior art which attempt to address and solve this problem, including such devices as Selig, U.S. Pat. No. 2,253,251, Wismeth, U.S. Pat. No. 6,861,652 and Lin, U.S. Pat. No. 4,902,411. Each of these prior art devices, however, include inherent disadvantages which do not permit their use in a situation where ease of portability and rapid filtration of substantial quantities of water is required. For example, Wismeth discloses a tank which disinfects aqueous media through use of a UV source, but only cleans a small quantity of drinking water at one time, thus rendering it useless for providing water to a large number of individuals. Selig and Lin, on the other hand, disclose filtration devices which will sterilize a larger quantity of water but which are not designed for transportability and thus cannot be quickly and easily transported to a location where the filtration of water is needed. There is therefore a need for an easily portable water filtration device which is also capable of filtering relatively large quantities of water to provide to a number of individuals needing the purified water.

Therefore an object of the present invention is to provide an improved portable water filtration device.

Another object of the present invention is to provide an improved portable water filtration device which includes a liquid-tight filter container and a filtration device mounted within the liquid-tight filter container which includes at least two filters selected from the group including UV filters, activated carbon filters and reverse osmosis filters, depending upon the filtration needs of the user of the present invention.

Another object of the present invention is to provide an improved portable water filtration device which is relatively light in weight thus permitting it to be easily transported and carried to locations where water filtration is needed.

Another object of the present invention is to provide and improved portable water filtration device which includes a battery unit connectable to an AC power source or to a solar panel or the like for charging the battery in order to power the UV filter and/or external pumping device to drive water into and through the portable water filtration device.

Another object of the present invention is to provide and improved portable water filtration device which does not include a pumping device built into the device to reduce weight and decrease the possibility of breakdowns of the elements of the unit.

Another object of the present invention is to provide and improved portable water filtration device which is usable with water flow through the device in either direction therethrough, i.e. the inlet and outlet openings are interchangeable for use.

Finally, an object of the present invention is to provide and improved portable water filtration device which is relatively simple and durable in design and construction and is safe, efficient and economical in use.

SUMMARY OF THE INVENTION

The present invention provides a portable water filtration device including a liquid-tight filter container having an interior volume, side walls, a base wall, a top opening and a lid movably mounted thereon for covering and sealing the top opening and a filtration device mounted in the liquid-tight container. The filtration device includes an inlet opening extending through one of the side walls and the lid for receiving liquid into the filtration device. A first filtration device in liquid transfer connection with the inlet opening is operative to receive and filter liquid flowing therethrough, and a second filtration device in liquid transfer connection with the first filtration device is operative to receive and further filter liquid flowing therethrough. The first and second filtration devices are selected from the group including ultraviolet, activated carbon and reverse osmosis filters, and the second filtration device permits the treated and purified water to proceed to an outlet opening in liquid transfer connection with the second filtration device and extending through one of the side walls and the lid for releasing liquid from the filtration device. Finally, the liquid-tight filter container is operative to prevent liquid from entering the interior volume thereof thereby preventing contamination of the filtration device from accidental incursion of contaminants into the liquid-tight filter container.

The present invention thus provides a portable water filtration device which is superior in many respects to those devices found in the prior art. For example, the relatively light weight and construction of the filtration device of the present invention permits the device to be quickly and easily transported to a location needing potable water. Also, the non-inclusion of a pumping device with the present invention significantly reduces the possibility of failure of operation of the portable water filtration device and simultaneously reduces the weight of the device thus permitting it to be more portable and more reliable than those devices found in the prior art. Furthermore, the inclusion of a battery with the filter provides power for the UV filtration device even in the event an external power source is not readily available, thus permitting use of the portable water filtration device at night, in the day or where no ready source of electrical power exits. Also, the inlet and outlet openings are interchangeable in that water may flow in either direction through the device, which means that it is virtually impossible to incorrectly hook up the water input and output hoses to the device. Finally, the multiple filtration provided by two or more different types of filtration devices renders the resulting outflow water far more safe than those single filtration devices found in the prior art, and thus the present invention provides a substantial improvement over those devices found in the prior art.

DESCRIPTION OF THE PREFERRED EMBODIMENT

Figure 1:
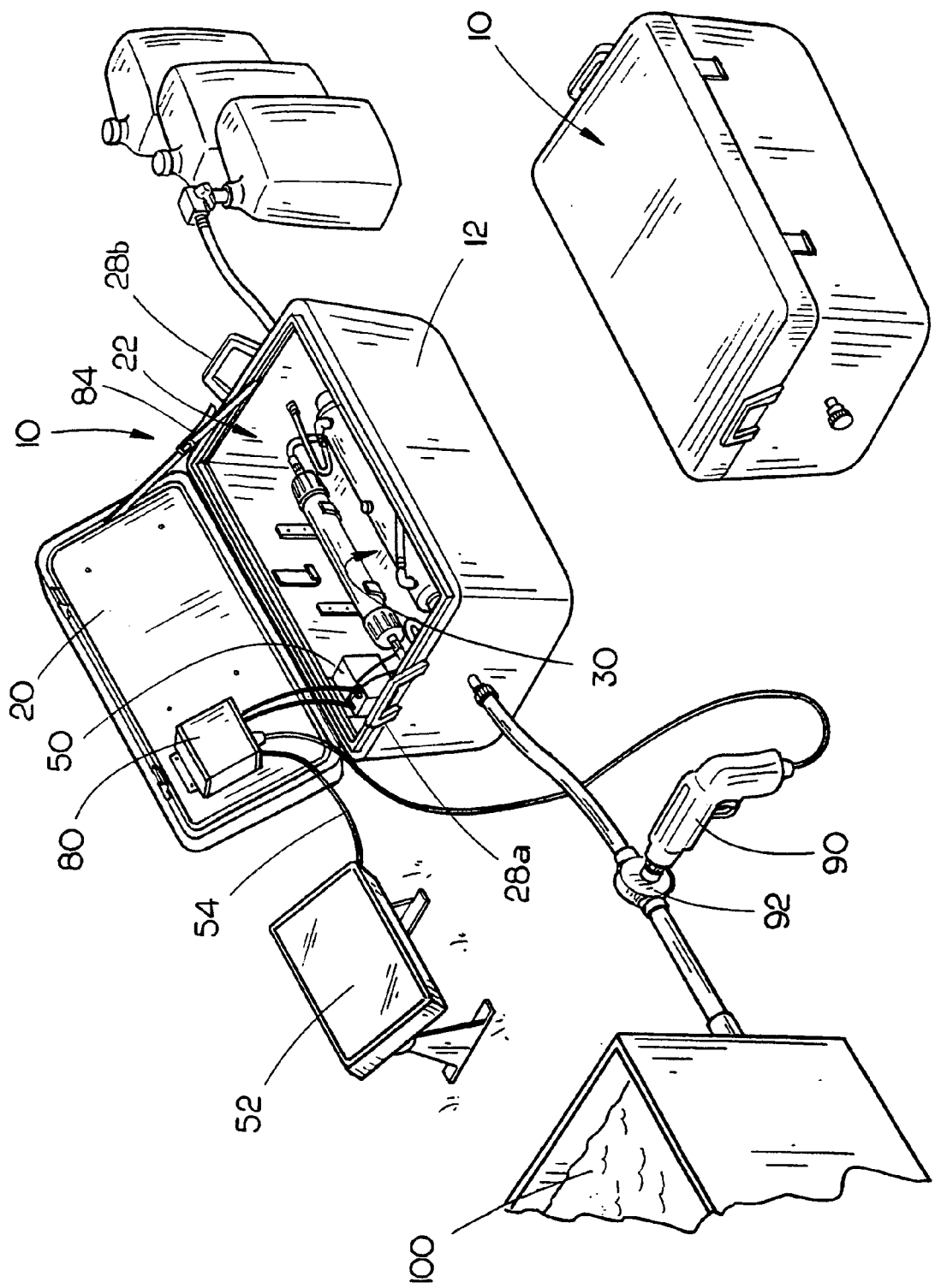
FIG. 1 is a perspective view of the portable water filtration device of the present invention filtering water.

The portable water filtration device 10 of the present invention is show best in FIGS. 1-4 as including a generally liquid-tight filter container 12 having front and rear walls 14*a* and 14*b*, left and right side walls 16*a* and 16*b*, base wall 18 and a top lid 20 hingedly connected to rear wall 14*b*, the top lid 20 operative to cover and enclose top opening 22 in the filter container 12. In the preferred embodiment, the liquid-tight filter container 12 would have dimensions approximately equal to the size of a 100 to 250 quart ice chest or cooler, with the specific dimensions being approximately 24 to 100 inches in length, 12 to 36 inches in width and approximately 12 to 36 inches in height. Furthermore, the construction materials used in connection with plastic ice chests, coolers or other such molded plastic containers may be used in connection with the liquid-tight filter container 12 of the present invention, as it is has been found that molded plastic construction materials provide the requisite light weight and high degree of impact and wear resistance necessary for proper functioning of the portable water filtration device 10 of the present invention. Of course, the specific construction materials and size and shape of the liquid-tight container 12 are not particularly critical to the present invention so long as it is generally light in weight for its size and also that top lid 20, when lowered onto front and rear walls 14*a* and 14*b* and side walls 16*a* and 16*b* to cover top opening 22, forms a generally liquid-tight seal to prevent the unintentional incursion of liquids into the interior of the liquid-tight container 12. Also, to permit the top lid 20 to be supported in the open position, an adjustable fabric or plastic strap 84 extends between and connects the side wall 16*a* and the top lid 20. The adjustable strap 84 is designed to support the top lid 20 at various angles relative to the liquid-tight container 12 in order to permit access to the devices mounted on the top lid 20 and to expose the solar panel 52 to sunlight at an optimum angle. Of course, the adjustable strap 84 is replaceable with any appropriate top lid rotation restriction device, so long as the intended function of preventing uncontrolled rotation of the top lid 20 relative to the liquid-tight container 12 is maintained.

Mounted within the liquid-tight container 12 is the filtration device 30, which in the preferred embodiment, would include the following elements. A base plate 32 is mounted on top of base wall 18 to elevate the elements of the filtration device 30 above the base wall 18 and a UV filter 40 is mounted on top the base plate 32, as shown best in FIG. 3. Mounted adjacent the UV filter 40 either on base plate 32 or on one of the front or rear walls 14*a* or 14*b* via a bracket 37 is an activated carbon or charcoal filter 36.

In the preferred embodiment, the carbon filter 36 would be designed as including an outer wall structure 60 which encloses a fabric filter bag 62 holding a quantity of activated charcoal 64, also known as activated carbon. The activated charcoal 64 functions by attracting and holding certain chemicals as water passes through it. Specifically, as used in the filtration industry, activated charcoal or carbon is charcoal that has been treated with oxygen to open up millions of tiny pores between the carbon atoms which permit the activated charcoal to adsorb chemicals and other carbon-based impurities by chemically bonding with those impurities as water passes through the activated charcoal. One of the benefits of activated charcoal-type filters is that they may process a relatively large volume of water in a short period of time, specifically in a flow-through filtration design, and thus relatively large quantities of water may be purified in a relatively short period of time. However, the nature of a carbon filter 36 ensures that at least some biological contaminants pass through the carbon filter 36 without being absorbed, and thus there is need for further filtration of the water passing through the filtration device 30, which is achieved by passing the water through the UV filter 40.

Figure 3:
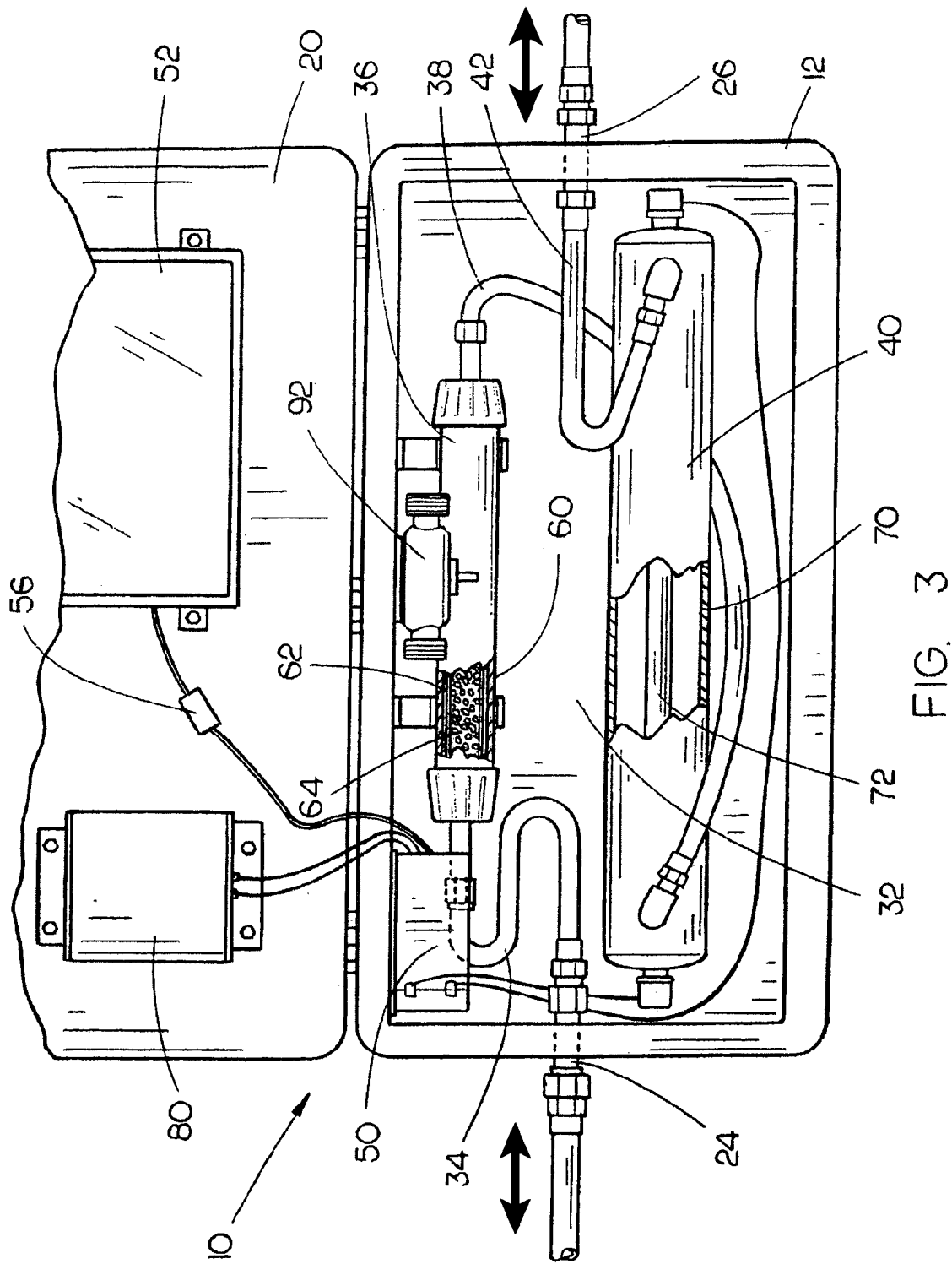
FIG. 3 is a detailed perspective view of the portable water filtration device of the present invention.

The UV filter 40, in the preferred embodiment, would include an outer wall structure 70 and a high-density UV (ultraviolet) lamp 72 mounted within the outer wall structure 70 and extending in general alignment with the center longitudinal axis of the outer wall structure 70, as shown best in FIG. 3. The lamp 72 may be powered by a transformer, ballast or other such electrical power feed device ordinarily used with UV filters, which would be connected to the battery 50 as will be described later in this disclosure. In the art of water filtration, UV filters function generally in the following manner. As water flows within outer wall 70 of UV filter 40, it passes past the high-density UV lamp 72 which exposes microorganisms within the water to ultraviolet light energy at approximately a 253.7 nanometer wave length. The exposure of the microorganisms to the ultraviolet light alters the DNA material in the microorganisms such that the microorganisms can no longer reproduce. They are thus considered dead and the risk of disease from ingesting the microorganism is eliminated. The effective kill rate of the microorganisms is extremely high, in the range of 99.99%, and thus treatment of water by a UV filter 40 is a highly effective way to eliminate microorganisms from the water in the filtration system.

The filtration device 30 would thus function in the following manner. An inlet valve 24 is mounted in side wall 16a and extends therethrough such that a source of water 100 may be connected to the inlet valve 24 to provide water to the filtration device 30 held within liquid-tight container 12. Inlet valve connection tube 34 extends between and connects inlet valve 24 with the carbon filter 36, thus feeding water from the inlet valve 24 to the carbon filter 36 for processing of the water therein. Water is forced through the carbon filter 36 to remove a large number of impurities from the water and the water then flows out of carbon filter 36 into filter connection tube 38 which extends from the outlet end of carbon filter 36 to the inlet end of UV filter 40, as shown best in FIGS. 2 and 3. The water then flows through UV filter 40, encountering high-density UV lamp 72 as it passes therethrough and exits the UV filter 40 having had the vast majority of the biological contaminants within the water eliminated. The purified water then flows out of UV filter 40 through outlet valve connection tube 42 to outlet valve 26 mounted on side wall 16b and extending therethrough. The filtered and purified water may then be used for any appropriate purpose, including drinking, bathing or any other such purpose desired by the user of the portable water filtration device 10 of the present invention.

Power for the UV filter 40 is provided by a battery 50 which is mounted within the liquid-tight container 12 to provide direct current to the transformer or ballast for the high-density UV lamp 72 within UV filter 40. It has been found that a high-quality rechargeable battery of the lithium ion or nickel-cadmium type provides a sufficient power source for the high-density UV lamp 72 of the present invention, and in fact will power the lamp 72 for a period in excess of 8 to 10 hours depending upon the battery 50 which is installed in the portable water filtration device 10 of the present invention.

Figure 2:
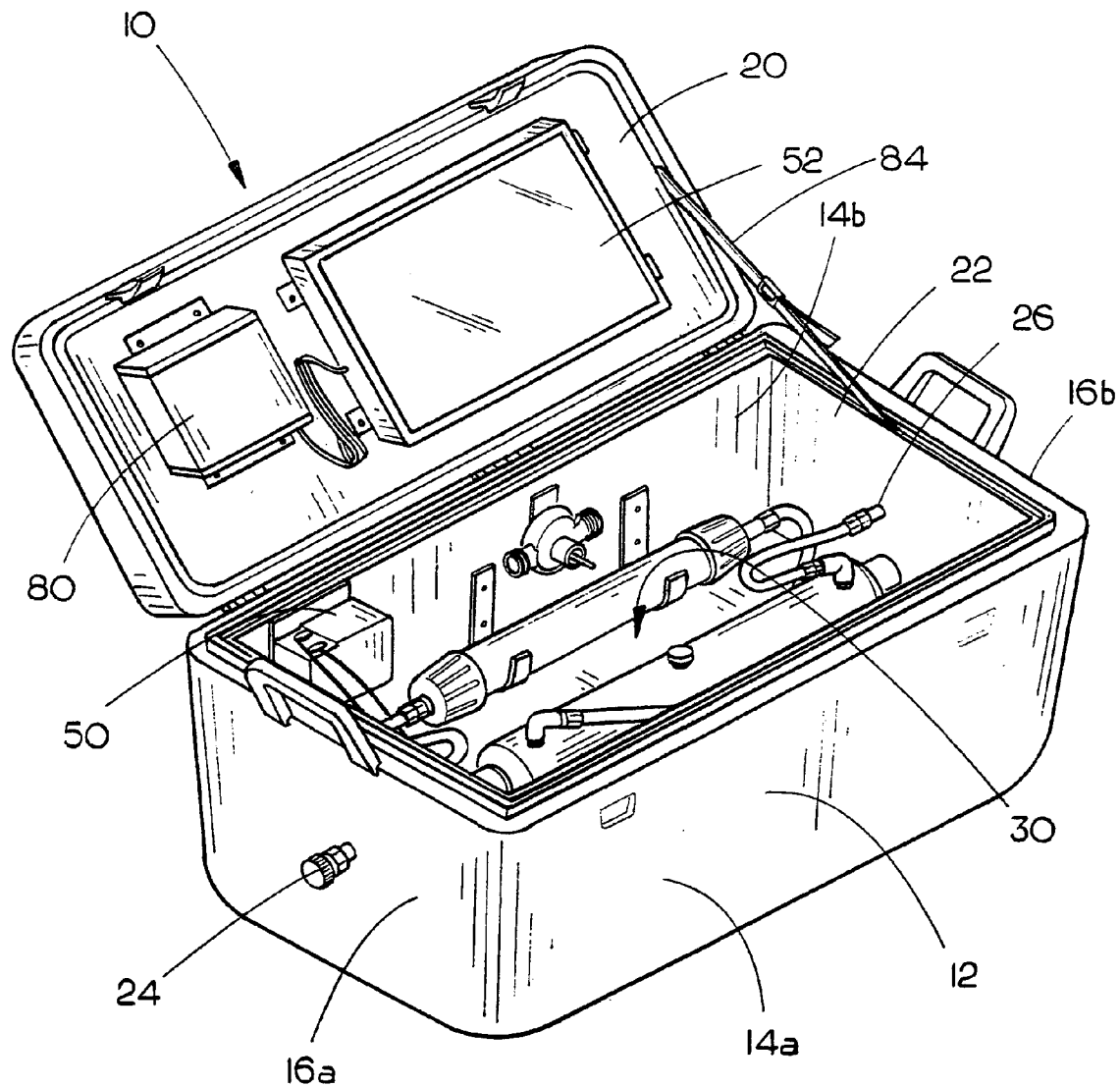
FIG. 2 is a top plan view of the present invention.

In the preferred embodiment, two different devices are provided to recharge the battery 50, the first being a solar panel 52 which is connected to the battery 50 by power wires 54, as shown best in FIGS. 1 and 2, and the second being a voltage inverter unit 80 which is preferably mounted on the underside of top lid 20 and which, when receiving power from an alternating current outlet, will convert the alternating current to direct current and feed the direct current into the battery 50 thus recharging the battery. The solar panel 52, on the other hand, directly feeds current to battery 50 through power wires 54 when the solar panel 52 is positioned in a power-generating (i.e. sun-exposed) location. To enable proper positioning of the solar panel 52, the solar panel 52 is built to be removable from the underside of top lid 20 where it is ordinarily positioned so that it may be placed on top of top lid 20 or in any appropriate location adjacent the portable water filtration device 10, as shown in FIG. 1, and the power wires 54 fit out through the connection between top lid 20 and the top surfaces of front and rear walls 14a and 14b and side walls 16a and 16b without affecting the liquid-tight seal formed between top lid 20 and those walls. An additional feature of the present invention is that the battery 50 may be charged by the solar panel 52 while the battery is powering the UV filter 40 or other electrical appliances, thus permitting the unit to function even while recharging. Furthermore, it may be important to include a solar charge controller 56 which will be interposed between the battery 50 and solar panel 52 to prevent discharge of the battery 50 through the solar panel 52 when the solar panel is not exposed to sunlight.

The voltage inverter 80 may also receive power from the battery 50, invert the DC current to AC and transfer it to an AC outlet which may be used to power various electrical appliances, including such devices as a drill 90 which would be used to power a drill pump 92 which would preferably be included in the portable water filtration device 10, as shown best in FIG. 1, the drill pump 92 operative to drive water into the inlet valve 24 through the filtration device 30 and out outlet valve 26 in the event a pressurized water source is not available in the immediate vicinity of the portable water filtration device 10. Of course, one of the significant advantages of the portable water filtration device 10 of the present invention is that it may be quickly and easily moved to the location of a pressurized water source, but it is not absolutely necessary to provide such a pressurized water source in order for the portable water filtration device 10 of the present invention to function. Moreover, many different types of water pumps may be used with the present invention, and small units may even be stored within the liquid-tight container 12, depending on the needs of the user of the present invention and the volume and flow rate of water desired for the present invention.

Figure 4:
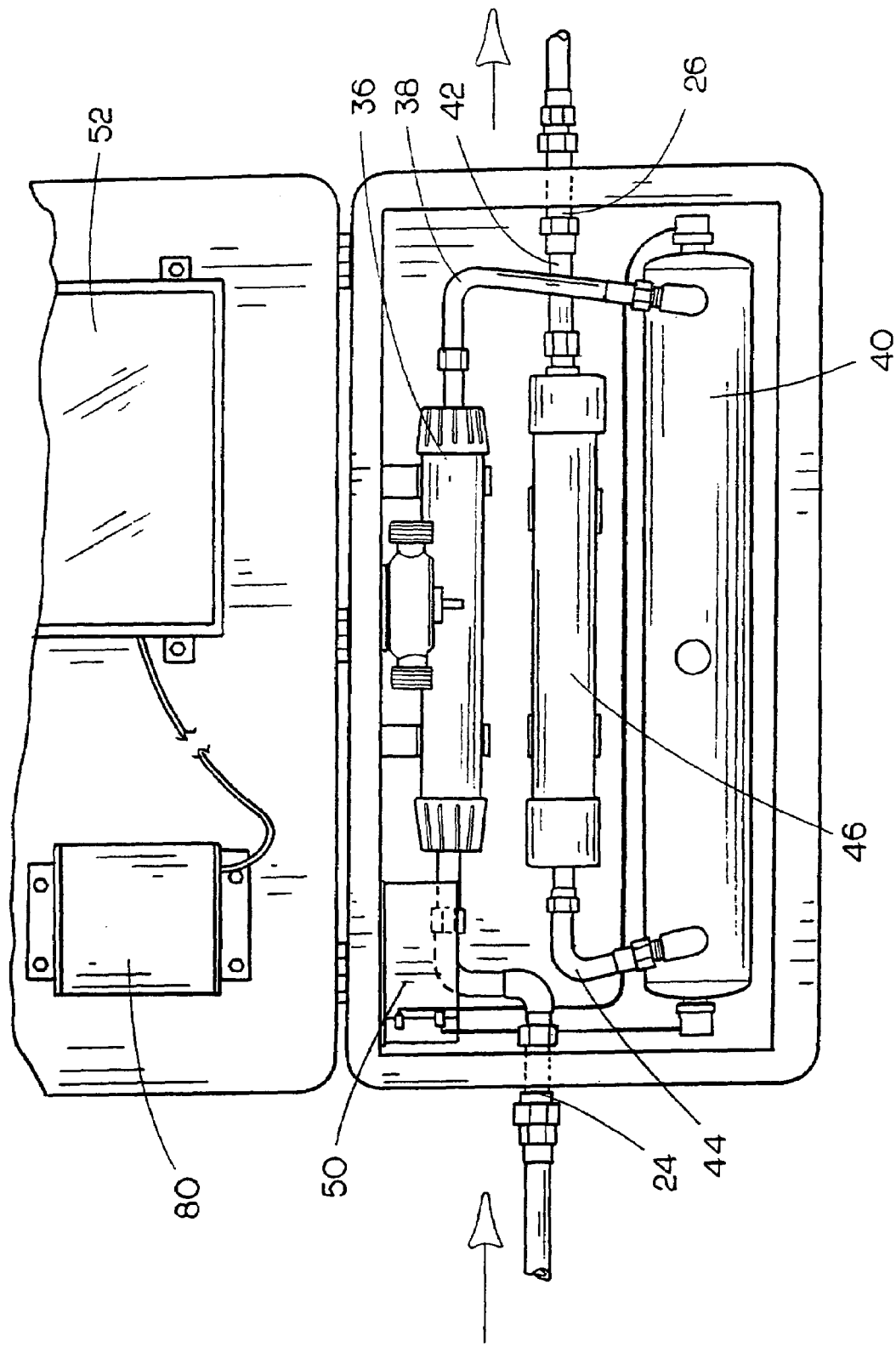
FIG. 4 is a perspective view of an alternative embodiment of the portable water filtration device of the present invention.

An alternative embodiment of the portable water filtration device 10 is shown best in FIG. 4 and would further include a reverse osmosis filter 46 which would be inserted into the filtration device 30 and preferably be mounted on base plate 32 within liquid-tight filter container 12. The reverse osmosis filter 46 would likely be positioned adjacent UV filter 40 so that a second filter connection tube 44 would extend from the outlet of UV filter 40 to the reverse osmosis filter 46 and outlet valve connection tube 42 would be connected to outlet end of reverse osmosis filter 46, as shown best in FIG. 4. In the industry, reverse osmosis filters function by sending water through one or more small filters that are perforated with hundreds or thousands of tiny holes. Pure water molecules are effectively allowed to pass through while unwanted contaminants are captured and discarded. The holes in the reverse osmosis filter are so small that they are invisible to the naked eye, and just large enough for water molecules to pass through. This leaves unwanted particles trapped in the filter, thus being removed from the water flowing through the reverse osmosis filter. It is expected that the three-step filtration process described in connection with the filtration device 30 of FIG. 4 will provide the most pure and uncontaminated water generally available, and will render virtually any type of contaminated water safe for drinking. The only disadvantage of including the reverse osmosis filter 46 in the filtration device 30 is that the volume of flow permitted by the reverse osmosis filter 46 is far more limited than that permitted by the carbon filter 36 and UV filter 40. However, in areas having highly contaminated water sources, such limitation on water flow will likely be thought of as an insignificant trade-off to obtain a reasonable quantity of drinking water. For comparison purposes, it is expected that the water flow without the reverse osmosis filter 46 in line with the filtration device 30 will be approximately twelve (12) gallons per minute, whereas installation of the reverse osmosis filter 46 in the filtration device 30 will limit the flow through to approximately one and one-half to two (1.5 to 2) gallons per minute. It should be noted, however, that the water flow through the device will in no case be less than one (1) gallon per minute in order to ensure that a sufficient quantity of water is produced by the present invention, assuming sufficient water inflow rate. Additionally, although the expected water flow without the reverse osmosis filter 46 in line with the filtration device 30 will be approximately twelve (12) gallons per minute, the actual flow will be at least one (1) gallon per minute depending on the inflow rate of the water through the device, and will vary directly with the rate of water inflow up to approximately twenty to thirty (20 to 30) gallons per minute.

By far the most significant element of the portable water filtration device 10 of the present invention is that by enclosing and sealing top lid 20 on liquid-tight filter container 12, all liquid contaminants are prevented from entering the interior of the liquid-tight filter container 12 which can contaminate filtration device 30. This is a problem encountered with numerous different filtration devices found in the prior art, and the reason why such filtration devices are generally unuseable in highly unstable areas, such as those encountered in the immediate aftermath of a natural disaster. With the portable water filtration device 10 of the present invention, however, a disaster relief agency may immediately ship a plurality of the devices to the areas hardest hit by the natural disaster and they may be quickly and easily connected to any appropriate pressurized water source by relief volunteers or individuals living in the area of the natural disaster. Because the unit is self-contained, it may be operated by virtually anyone capable of connecting threaded hoses to the inlet and outlet valves 24 and 26 to feed water into and through the filtration device 30 of the portable water filtration device 10. Furthermore, in the event that the natural disaster reoccurs, as often happens with volcanic eruptions, earthquakes and/or tsunamis, the liquid-tight filter container 12 protects the filtration device 30 housed there within and prevents damage to the filtration device 30 in addition to preventing contamination of the filtration device 30. The portable water filtration device 10 thus will immediately be useable following the reoccurrence of the natural disaster, a feature not found in any of the devices found in the prior art. Also, an important feature of the present invention is that should the unit be immersed in water or another such liquid, with the lid 20 tightly sealing the interior volume of the liquid-tight container 12, the portable water filtration device 10 will float, thus allowing the unit to survive the immersion and be quickly found after the immersion. The portable water filtration device 10 thus provides a substantial improvement over those devices found in the prior art, and addresses needs not even considered by those devices found in the prior art.

A secondary but equally important feature of the present invention is that water to be purified by the filtration device 30 may flow through the device in either direction, specifically, either into the inlet valve 24, through the filtration device 30 and out through the outlet valve 26, and also vice-versa. This feature is completely unknown in the prior art, yet is of great importance in that it virtually ensures that the connection of the hoses to the inlet and outlet valves 24 and 26 and the feeding of water to be purified through the filtration device 30 cannot be done improperly. Even if the user of the present invention connects an inlet hose to the outlet valve 26 and feeds water through the filtration device 30 in reverse, filtered and cleaned water will flow out of the inlet valve 24 and the present invention will not be damaged in any way.

The unique features of the present invention which allow this reversibility function are that the carbon filter 36, the UV filter 40 and the reverse osmosis filter 46 will filter water regardless of the direction of water flow therethrough and more importantly, there are no moving parts in the device which require unidirectional fluid flow through the device. It is important to note that this feature means that specialized training is not needed to properly operate the present invention, and therefore it can be dropped into locations where it is needed without requiring trained attendants to drop along with the unit. Far more persons may thus benefit from the present invention, and whether they connect the feed and outlet hoses in the preferred orientation or accidentally reverse the hoses, the present invention will filter water and function as intended. Therefore, wherever the portable water filtration device 10 of the present invention is needed, it can be delivered and set up by locals, thus quickly and efficiently supplying potable water to the people.

The reverse action is also important in recharging the various filters when the unit is in the field. The carbon filter 36, the UV filter 40 and the reverse osmosis filter 46 may become clogged with debris, particularly when heavily contaminated water is being cleaned by the invention. The reversing option, by forcing the flow of water in the opposite direction, is operative to force any debris out of the filter and out of the machine thereby leaving a generally clear channel for free flow of water therethrough. The portable water purification device 10 therefore has a free flow capability that enables the unobstructed flow of water through the device.

An additional feature of the present invention is that when in use, the device produces a degree of siphoning energy which decreases the amount of pumping necessary to feed water through the device. In certain situations, the pumping device need only be run approximately one (1) minute thereby conserving energy on the battery. After the 1-minute running time, the pump would be shut down either by unplugging the pump from the electrical outlet of the device or switching the pump off. Water will free flow at approximately one-third (⅓) of its regular flow rate when the water source is at a higher elevation than the portable water purification device 10. It should be noted that this feature is not available in the vast majority of prior art devices simply because there are too many internal obstructions in those devices that prevent the water from freely flowing through the internal elements of those prior art water purifiers, and this again is an invaluable feature when the present invention is being used in less than ideal circumstances.

It is to be understood that numerous additions, modifications and substitutions may be made to the portable water filtration device 10 of the present invention which fall within the intended broad scope of the appended claims. For example, the size, shape and construction materials used in connection with the liquid-tight filter container 12 and filtration device 30 may be modified or changed so long as the functional and flow features of each of the elements are maintained. Furthermore, the specific design and features of the battery 50, solar panel 52 and voltage inverter 80 may be modified or changed to accommodate the needs of the UV filter 40 or any other power needs which will be recognized through further experimentation with the portable water filtration device 10 of the present invention. Also, the liquid-tight container 12 may further include a protective panel (not shown) which fits over and covers the filtration device 30 within the liquid-tight container 12 to prevent damage and contamination to the filtration device 30 when the top lid 20 is opened. Finally, although the series of filters has been described as first having water flow through carbon filter 36, then through UV filter 40 then through reverse osmosis filter 46, the specific order of filtration is not specifically critical to the present invention so long as the water input into the filtration device 30 is sufficiently purified to allow it to be used for drinking water, and, as was described previously, even complete reversal of the water flow through the device is perfectly acceptable.

There has therefore been shown and described a portable water filtration device 10 which accomplishes at least all of its intended objectives.

I claim:

1. A portable water filtration device comprising:
   a liquid-tight filter container having an interior volume, side walls, a base wall, a top opening and a lid mounted thereon, said lid movable between an open position and a closed position wherein said lid covers and seals said top opening to make said liquid-tight filter container liquid-tight;
   a filtration device mounted in said liquid-tight container, said filtration device including;
      an inlet opening extending through one of said side walls and said lid for receiving liquid into said filtration device;
      a first filtration device in liquid transfer connection with said inlet opening for receiving and filtering liquid flowing therethrough;
      a second filtration device in liquid transfer connection with said first filtration device for receiving and further filtering liquid flowing therethrough;
      said first and second filtration devices selected from the group comprising ultraviolet, activated carbon and reverse osmosis filters;
      an outlet opening in liquid transfer connection with said second filtration device and extending through one of said side walls and said lid for releasing liquid from said filtration device;
      said filtration device operable to filter liquid therethrough via liquid flow in either direction through said filtration device, said filtration device free of unidirectional flow-specific operative elements whereby liquid flowing through said filtration device is filtered regardless of flow direction, said inlet opening being usable for alternative input of liquid and output of liquid and said outlet opening being usable for alternative input of liquid and output of liquid from said filtration device;
      said filtration device operative to filter liquid at a flow rate of at least one (1) gallon per minute; and
   said filtration device operative with said lid of said liquid-tight filter container in both open and closed positions such that said liquid-tight filter container, when said lid of said liquid-tight filter container is in said closed position, is operable to prevent liquid from entering said interior volume thereof external of said filtration device thereby preventing contamination of said filtration device from accidental incursion of contaminants into said liquid-tight filter container.

2. The portable water filtration device of claim 1 wherein said inlet opening is connectable to a fresh water source operative to deliver fresh water by a pump means to said inlet opening.

3. The portable water filtration device of claim 1 further comprising a third filtration device in liquid transfer connection with said second filtration device for receiving and further filtering liquid flowing therethrough and in liquid transfer connection with said outlet opening, said first, second and third filtration devices each selected from the group comprising ultraviolet, activated carbon and reverse osmosis filters wherein each of said first, second and third filtration devices is a different one of the types of filters.

4. The portable water filtration device of claim 1 further comprising a battery mounted within said liquid-tight container to provide direct current to said UV filter for providing electrical power thereto.

5. The portable water filtration device of claim 4 further comprising a solar panel operative to feeds direct current to said battery upon said solar panel being positioned in a power-generating, generally sun-exposed location.

6. The portable water filtration device of claim 1 wherein said liquid-tight filter container is constructed of a lightweight, impact-resistant molded plastic material.

7. The portable water filtration device of claim 1 wherein said lid of said liquid-tight filter container is pivotably mounted on a rear wall of said liquid-tight filter container to permit resealable access to said interior volume of said liquid-tight filter container.

8. A portable water filtration device comprising:
   a liquid-tight filter container having an interior volume, side walls, a base wall, a top opening and a lid mounted thereon, said lid movable between an open position and a closed position wherein said lid covers and seals said top opening to make said liquid-tight filter container liquid-tight;
   a filtration device mounted in said liquid-tight container, said filtration device including;
      an inlet opening extending through one of said side walls and said lid for receiving liquid into said filtration device;
      a first filtration device in liquid transfer connection with said inlet opening for receiving and filtering liquid flowing therethrough;
      a second filtration device in liquid transfer connection with said first filtration device for receiving and further filtering liquid flowing therethrough;
      a third filtration device in liquid transfer connection with said second filtration device for receiving and further filtering liquid flowing therethrough;
      said first, second and third filtration devices each selected from the group comprising ultraviolet, activated carbon and reverse osmosis filters wherein each of said first, second and third filtration devices is a different one of the types of filters;
      an outlet opening in liquid transfer connection with said third filtration device and extending through one of said side walls and said lid for releasing liquid from said filtration device;
      said filtration device operable to filter liquid therethrough via liquid flow in either direction through said filtration device, said filtration device free of unidirectional flow-specific operative elements whereby liquid flowing through said filtration device is filtered regardless of flow direction, said inlet opening being usable for alternative input of liquid and output of liquid and said outlet opening being usable for alternative input of liquid and output of liquid from said filtration device;

said filtration device operative to filter liquid at a flow rate of at least one (1) gallon per minute; and said filtration device operative with said lid of said liquid-tight filter container in both open and closed positions such that said liquid-tight filter container, when said lid of said liquid-tight filter container is in said closed position, is operable to prevent liquid from entering said interior volume thereof external of said filtration device thereby preventing contamination of said filtration device from accidental incursion of contaminants into said liquid-tight filter container.

9. The portable water filtration device of claim 8 wherein said inlet opening is connectable to a fresh water source operative to deliver fresh water by a pump means to said inlet opening.

10. The portable water filtration device of claim 8 further comprising a battery mounted within said liquid-tight container to provide direct current to said UV filter for providing electrical power thereto.

11. The portable water filtration device of claim 10 further comprising a solar panel operative to feeds direct current to said battery upon said solar panel being positioned in a power-generating, generally sun-exposed location.

12. The portable water filtration device of claim 8 wherein said liquid-tight filter container is constructed of a lightweight, impact-resistant molded plastic material.

13. The portable water filtration device of claim 8 wherein said lid of said liquid-tight filter container is pivotably mounted on a rear wall of said liquid-tight filter container to permit resealable access to said interior volume of said liquid-tight filter container.

14. A portable water filtration device comprising:

a liquid-tight filter container having an interior volume, side walls, a base wall, a top opening and a lid movably mounted thereon, said lid movable between an open position and a closed position wherein said lid covers and seals said top opening to make said liquid-tight filter container liquid-tight;

a filtration device mounted in said liquid-tight container, said filtration device including;

an inlet opening extending through one of said side walls and said lid for receiving liquid into said filtration device;

a first filtration device in liquid transfer connection with said inlet opening for receiving and filtering liquid flowing therethrough;

a second filtration device in liquid transfer connection with said first filtration device for receiving and further filtering liquid flowing therethrough;

said first and second filtration devices selected from the group comprising ultraviolet, activated carbon and reverse osmosis filters;

an outlet opening in liquid transfer connection with said second filtration device and extending through one of said side walls and said lid for releasing liquid from said filtration device;

said filtration device operable to filter liquid therethrough via liquid flow in either direction through said first and second filtration devices, said inlet opening being usable for alternative input of liquid and output of liquid and said outlet opening being usable for alternative input of liquid and output of liquid from said filtration device;

said filtration device operative to filter liquid at a flow rate of at least one (1) gallon per minute;

a battery device in power transmission connection with at least one of said first and second filtration devices for powering said at least one of said first and second filtration devices; and said filtration device operative with said lid of said liquid-tight filter container in both open and closed positions such that said liquid-tight filter container, when said lid of said liquid-tight filter container is in said closed position, is operable to prevent liquid from entering said interior volume thereof external of said filtration device thereby preventing contamination of said filtration device from accidental incursion of contaminants into said liquid-tight filter container.

* * * * *